United States Patent
Kim

(10) Patent No.: US 11,332,107 B2
(45) Date of Patent: May 17, 2022

(54) SYSTEM AND METHOD FOR OPERATING REDUNDANCY BRAKING IN CASE OF BREAKDOWN OF MAIN BRAKE FOR AUTONOMOUS VEHICLE

(71) Applicants: HYUNDAI MOTOR COMPANY, Seoul (KR); KIA MOTORS CORPORATION, Seoul (KR)

(72) Inventor: In-Su Kim, Anyang-si (KR)

(73) Assignees: HYUNDAI MOTOR COMPANY, Seoul (KR); KIA MOTORS COPORATION, Seoul (KR)

( * ) Notice: Subject to any disclaimer, the term of this patent is extended or adjusted under 35 U.S.C. 154(b) by 204 days.

(21) Appl. No.: 16/598,122

(22) Filed: Oct. 10, 2019

(65) Prior Publication Data

US 2021/0009095 A1 Jan. 14, 2021

(30) Foreign Application Priority Data

Jul. 11, 2019 (KR) .................. 10-2019-0084111

(51) Int. Cl.
| | |
|---|---|
| *B60T 8/00* | (2006.01) |
| *B60T 8/18* | (2006.01) |
| *G05D 1/02* | (2020.01) |
| *B60W 10/184* | (2012.01) |

(52) U.S. Cl.
CPC ......... *B60T 8/1881* (2013.01); *B60W 10/184* (2013.01); *G05D 1/021* (2013.01); *B60T 2270/402* (2013.01); *B60T 2270/60* (2013.01)

(58) Field of Classification Search
CPC ................................. B60T 8/1755; B60T 7/12
See application file for complete search history.

(56) References Cited

U.S. PATENT DOCUMENTS

| | | | |
|---|---|---|---|
| 8,935,071 B2 | 1/2015 | Lee et al. | |
| 2013/0253793 A1* | 9/2013 | Lee | B62D 9/005 701/70 |
| 2014/0015310 A1* | 1/2014 | Hanzawa | B60T 17/22 303/3 |
| 2018/0345923 A1* | 12/2018 | Cheon | B60T 8/171 |
| 2019/0001941 A1 | 1/2019 | Westlund et al. | |

FOREIGN PATENT DOCUMENTS

| | | |
|---|---|---|
| KR | 101527614 | 9/2009 |
| KR | 20130037751 | 10/2011 |
| KR | 20170109006 | 2/2016 |

* cited by examiner

*Primary Examiner* — Truc M Do
(74) *Attorney, Agent, or Firm* — Lempia Summerfield Katz LLC

(57) ABSTRACT

The present disclosure relates to a system and method for operating a main brake in case of a failure of an autonomous driving function of an autonomous vehicle. the system for operating the main brake in case of a failure of the autonomous driving function of the autonomous vehicle includes an autonomous driving control unit configured to perform control such that the autonomous vehicle travels in the autonomous driving mode, a main brake control unit configured to perform first communication with the autonomous driving control unit and to output a first control signal so that a frictional braking force is generated to a main brake by hydraulic pressure, and a regenerative braking control unit configured to perform second communication with the main brake control unit and to output a second control signal so that a regenerative braking force is generated to a motor.

10 Claims, 8 Drawing Sheets

SYSTEM AND METHOD FOR OPERATING REDUNDANCY BRAKING IN CASE OF BREAKDOWN OF MAIN BRAKE FOR AUTONOMOUS VEHICLE

CROSS-REFERENCE TO RELATED APPLICATION

This application claims priority to and the benefit of Korean Patent Application No. 10-2019-0084111, filed on Jul. 11, 2019, which is incorporated herein by reference in its entirety.

FIELD

The present disclosure relates to a system and a method for operating redundancy braking in case of a breakdown of a main brake for an autonomous vehicle.

BACKGROUND

The statements in this section merely provide background information related to the present disclosure and may not constitute prior art.

In general, an autonomous vehicle refers to a vehicle that may autonomously travel to a set destination while autonomously monitoring external information and recognizing road conditions without a driver's manipulation.

An example of an autonomous driving system includes an autonomous driving control unit and a main brake control unit, and the autonomous driving control unit and the main brake control unit interface with each other through communication. Therefore, in an autonomous driving mode, the autonomous driving control unit transmits a braking signal to the main brake control unit, and the main brake control unit, which has received the braking signal, appropriately operates a main brake, thereby assisting the autonomous vehicle in safely reaching a destination.

The autonomous driving mode and a driver driving mode may be switched to each other while the autonomous vehicle travels. For example, the autonomous driving mode, which enables the driver to perform other tasks besides driving, such as reading a book or using a smart phone, may be switched to the driver driving mode depending on the driver's intention or a change in environment outside the vehicle. In particular, when there is an obstacle on a driving road and thus the driver needs to brake the vehicle quickly, the mode switching is performed at a point in time at which a driving control authority is passed to the driver. Here, the driving control authority means that a sufficient pedal effort may be applied to a brake pedal to satisfy the braking force required by the driver. There is a need for a method capable of calculating the braking force required for the autonomous vehicle while the mode switching is performed.

We have discovered that in case of a function failure of the main brake control unit, the braking force cannot be generated in the autonomous vehicle, which may cause a dangerous situation. Therefore, even in this case, it is necessary to perform an action to generate the braking force in the autonomous vehicle.

As a technology for assisting the main brake, Korean Patent No. 10-1527614 (Electronic Braking Control Method for Vehicle) in the related art discloses a technology of minimizing vehicle rattling that occurs when switching a braking force from an electronic stability control (ESC) braking force to an electronic parking brake (EPB) braking force in a control method between the electronic stability control (ESC) and the electronic parking brake (EPB).

However, we have discovered that Document Korean Patent No. 10-1527614 (Electronic Braking Control Method for Vehicle) fails to disclose a cooperative control method between the main brake control unit, the electronic stability control (ESC), and the electronic parking brake (EPB) in the autonomous vehicle.

The above information disclosed in this Background section is only for enhancement of understanding of the background of the present disclosure, and therefore it may contain information that does not form the prior art that is already known to a person of ordinary skill in the art.

SUMMARY

The present disclosure provides an autonomous vehicle to assist a main brake in an emergency situation in which the main brake cannot be used.

According to one aspect of the present disclosure, the present disclosure provides a system for operating redundancy braking in case of a breakdown of a main brake for an autonomous vehicle. The system includes a main brake control unit configured to output a control signal so that a frictional braking force is generated to a main brake of the autonomous vehicle by hydraulic pressure, a redundancy braking control unit configured to perform communication with the main brake control unit and perform cooperative control between electronic stability control (ESC) and an electronic parking brake (EPB) so that a calculated target braking force is satisfied when it is determined that the main brake control unit has a function failure, and a sensor unit configured to receive vehicle interior information and vehicle exterior information of the autonomous vehicle and transmit the vehicle interior information and the vehicle exterior information to the redundancy braking control unit. In addition, the redundancy braking control unit may control and replace rear-wheel ESC braking force with rear-wheel EPB braking force when the rear-wheel ESC braking force satisfies the target braking force.

According to a further aspect of the present disclosure, the redundancy braking control unit includes a breakdown determining unit configured to determine whether the main brake control unit is broken down based on an autonomous driving mode or a driver driving mode. The redundancy braking control unit determines whether the main brake control unit is broken down based on wheel hydraulic pressure information received through the sensor unit. When it is determined that the main brake control unit is broken down in the driving mode, the redundancy braking control unit calculates the target braking force based on information about a pedal effort applied to a brake pedal. When it is determined that the main brake control unit is broken down in the autonomous driving mode, the redundancy braking control unit calculates the target braking force based on information collected by the sensor unit for a period time for which the autonomous driving mode is switched to the driver driving mode.

According to a further aspect of the present disclosure, the redundancy braking control unit includes a rear-wheel EPB braking force operating unit configured to simultaneously operate the rear-wheel EPB braking force and the rear-wheel ESC braking force.

According to a further aspect of the present disclosure, the redundancy braking control unit includes a rear-wheel ESC braking force releasing unit configured to release the rear-wheel ESC braking force when the rear-wheel EPB braking force satisfies the target braking force.

According to a further aspect of the present disclosure, the redundancy braking control unit includes a rear-wheel EPB braking force increasing unit configured to determine whether to add the rear-wheel EPB braking force after the rear-wheel ESC braking force is released, and a front-wheel ESC braking force decreasing unit configured to decrease front-wheel ESC braking force when the rear-wheel EPB braking force is added.

According to another aspect of the present disclosure, a method of operating redundancy braking in case of a breakdown of a main brake for an autonomous vehicle includes the steps of determining whether a main brake control unit and a redundancy braking control unit of the autonomous vehicle communicate with each other, determining, by the redundancy braking control unit, whether the main brake control unit has a function failure, calculating, by the redundancy braking control unit, a target braking force when it is determined that the main brake control unit has a function failure, and performing, by the redundancy braking control unit, cooperative control between the ESC and the EPB so that the calculated target braking force is satisfied and performing control to replace rear-wheel ESC braking force with rear-wheel EPB braking force when the rear-wheel ESC braking force satisfies the target braking force.

According to a further aspect of the present disclosure, the method includes the step of determining whether the autonomous vehicle is in an autonomous driving mode or a driver driving mode when the main brake control unit and the redundancy braking control unit do not communicate with each other. The method further includes the step of calculating the target braking force based on information collected by a sensor unit for a period time for which the autonomous driving mode is switched to the driver driving mode when the autonomous vehicle is in the autonomous driving mode and the main brake control unit is broken down. In addition, the method includes the step of calculating the target braking force based on information about a pedal effort applied to a brake pedal when the autonomous vehicle is in the driver driving mode and the main brake control unit is broken down.

According to a further aspect of the present disclosure, the method includes the step of controlling and simultaneously operating, by the redundancy braking control unit, the rear-wheel EPB braking force and the rear-wheel ESC braking force.

According to a further aspect of the present disclosure, the method includes step of controlling and releasing, by the redundancy braking control unit, the rear-wheel ESC braking force when the rear-wheel EPB braking force satisfies the target braking force.

According to a further aspect of the present disclosure, the method includes the steps of determining, by the redundancy braking control unit, whether to add the rear-wheel EPB braking force after the rear-wheel ESC braking force is released, and decreasing, by the redundancy braking control unit, front-wheel ESC braking force when the rear-wheel EPB braking force is added.

The system and the method for operating redundancy braking in case of a breakdown of a main brake for the autonomous vehicle according to an exemplary form of the present disclosure have the following effects.

First, according to the present disclosure, in a case in which the redundancy braking control unit and the main brake control unit do not communicate with each other, whether the main brake control unit has a function failure is determined, the main brake having an excellent braking force is used first, and the ESC and the EPB are accessorily used and controlled, such that an excellent effect is made in terms of the braking force.

Second, according to the present disclosure, the target braking force is distinguished and calculated based on the autonomous driving mode or the driver driving mode of the autonomous vehicle, such that there is an effect of reducing heterogeneity of the braking force.

Third, according to the present disclosure, there is an effect of protecting the ESC having a low endurance performance by replacing the rear-wheel ESC braking force with the rear-wheel EPB braking force.

Fourth, according to the present disclosure, there is an effect of protecting the ESC having a low endurance performance by decreasing the front-wheel ESC braking force when the rear-wheel EPB braking force is added.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
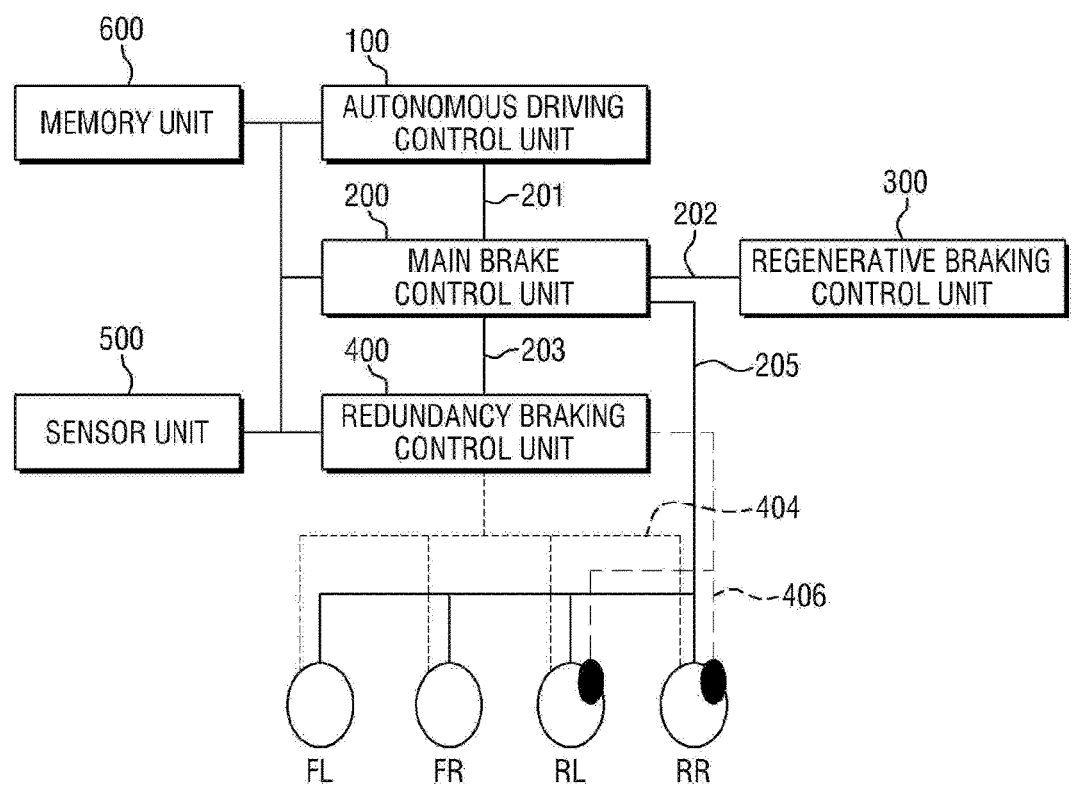
FIG. 1 is a view schematically illustrating an entire braking system for an autonomous vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a view schematically illustrating an entire braking system for an autonomous vehicle according to an exemplary form of the present disclosure.

Referring to FIG. 1, the entire braking system for an autonomous vehicle includes an autonomous driving control unit 100, a main brake control unit 200, a regenerative braking control unit 300, a redundancy braking control unit 400, a sensor unit 500, and a memory unit 600. Each component may be modularized and separated. A control function and a communication function may be performed by an electronic control unit (ECU) separately mounted for each control unit, and functions of the respective control units may be performed by the single ECU. The ECU module may be provided with one or more processors configured to operate by a set program, and the ECU module is configured to perform respective steps of an operating method to be described below.

The autonomous driving control unit 100 has a function of sensing and processing external information by means of the sensor unit 500 and autonomously determines a traveling route by recognizing the surrounding environment when the autonomous vehicle travels even though a driver does not control a brake, a steering wheel, an accelerator pedal, and the like. The autonomous driving control unit 100 transmits and receives a first control signal, which is a braking signal, to/from the main brake control unit 200 through a first communication 201.

The main brake control unit 200 is configured to control a main brake. Here, the main brake generates hydraulic braking pressure in response to an instruction from the autonomous driving control unit 100 and to a pedal effort applied to a brake pedal by the driver, and transmits the hydraulic pressure to wheel cylinders installed in respective vehicle wheels, thereby performing frictional braking. The main brake control unit 200 includes integrity electronic braking (IEB), integrity dynamic braking (IDB), and the like.

The regenerative braking control unit 300 stores driving energy in a battery when the driving energy is generated by counter electromotive force of a motor in response to an instruction from the autonomous driving control unit 100 or a pedal effort applied to the brake pedal by the driver, thereby control the autonomous vehicle to perform regenerative braking. The regenerative braking control unit 300 transmits and receives a second control signal, which is a braking signal, to/from the main brake control unit 200 through a second communication 202.

The redundancy braking control unit 400 serves as an auxiliary brake in a situation in which braking force is not applied to each of the vehicle wheels due to a breakdown of the main brake control unit 200. The redundancy braking control unit 400 includes electric stability control (ESC), which is vehicle posture control, and electric parking brake (EPB) which is electronic parking braking. The redundancy braking control unit 400 transmits and receives a third control signal, which is a braking signal, to/from the main brake control unit 200 through a third communication 203.

The ESC is a hydraulic modulator that produces hydraulic pressure to transmit the hydraulic pressure to the respective vehicle wheels in a case in which the hydraulic braking pressure cannot be produced due to a breakdown of the main brake control unit 200. However, because of a low operating endurance limit, the ESC is operated only in an emergency situation in which the main brake control unit 200 is broken down.

The EPB is a brake used when the vehicle is stationary, but in the exemplary form of the present disclosure, the EPB is used to assist the ESC with a low operating endurance limit. Here, the EPB operates for the rear wheels RL and RR, but the present disclosure is not necessarily limited thereto, and the EPB may be used for the front wheels FL and FR or the front and rear wheels FL, FR, RL, and RR.

Referring to FIG. 1, the braking system for an autonomous vehicle according to the exemplary form of the present disclosure basically controls the main brake control unit 200 to transmit the hydraulic braking pressure to the respective vehicle wheels through a main hydraulic line 205. However, in a case in which the hydraulic braking pressure cannot be produced due to a breakdown of the main brake control unit 200, cooperative control of the ESC and the EPB is performed such that the ESC controls and transmits the hydraulic braking pressure to the respective vehicle wheels through a first redundancy line 404 and the EPB controls an electric current through a second redundancy line 406 to brake the rear wheel.

The sensor unit 500 includes vehicle interior information and vehicle exterior information. Here, the vehicle interior information means information measured by various types of sensors installed in the vehicle, for example, a pedal effort sensor, a wheel speed sensor, a wheel hydraulic pressure sensor, a yaw rate sensor, a steering angle sensor, a lateral acceleration sensor, and the like. In addition, the vehicle exterior information means information collected by RADAR, LIDAR, an image sensor, GPS, a navigation system, and the like to recognize an obstacle or a lane on a road on which the autonomous vehicle is traveling or to recognize a traveling route of the autonomous vehicle or traveling routes of other vehicles at the periphery of the autonomous vehicle.

The memory unit 600 receives and stores the vehicle interior information and the vehicle exterior information collected by the sensor unit 500. The memory unit 600 may delete previously stored information to inhibit an overflow of a memory to be used for a driver authority switching unit 423 to be described below. For example, the memory unit 600 may delete the previously stored memory when there is no braking signal from the autonomous driving control unit 100 or the main brake control unit 200.

A system for operating redundancy braking in case of a breakdown of a main brake according to the exemplary form of the present disclosure is a system in which the redundancy braking control unit 400 involves braking the autonomous vehicle in an emergency situation in which the main brake control unit 200 has a function failure in the entire braking system of the autonomous vehicle.

Figure 2:
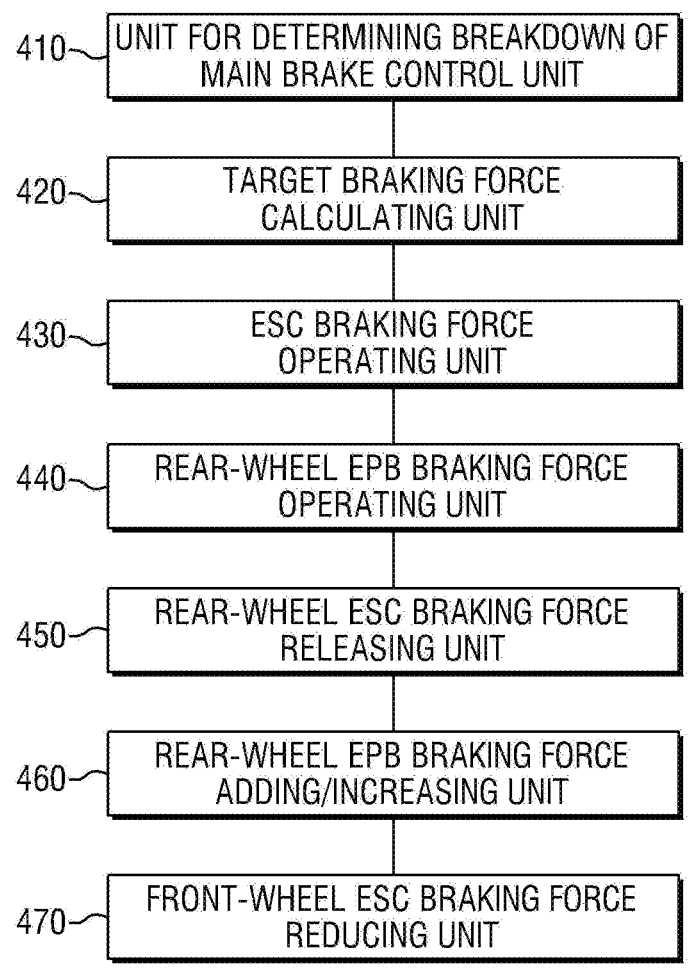
FIG. 2 is a view illustrating a schematic configuration of a redundancy braking control unit according to the exemplary form of the present disclosure.

FIG. 2 is a view illustrating a schematic configuration of the redundancy braking control unit according to the exemplary form of the present disclosure.

Referring to FIG. 2, in order for the redundancy braking control unit 400 to perform the braking, the redundancy braking control unit 400 includes a breakdown determining unit 410, a target braking force calculating unit 420, an ESC braking force operating unit 430, a rear-wheel EPB braking force operating unit 440, a rear-wheel ESC braking force releasing unit 450, a rear-wheel EPB braking force adding/increasing unit 460, and a front-wheel ESC braking force reducing unit 470.

When the redundancy braking control unit 400 cannot receive the third control signal from the main brake control unit 200 through the third communication 203, the breakdown determining unit 410 determines whether the main brake control unit 200 has a function failure. The third communication 203 may not be performed because a problem occurs in a communication line for the third communication 203 or the main brake control unit 200 has a function failure. Here, if there is no problem with the function of the main brake control unit 200, it is advantageous, in terms of braking force, to operate the main brake control unit 200. However, the redundancy braking control needs to be performed if it is determined that the main brake control unit 200 has a function failure.

In a situation in which the third communication 203 is not performed, the redundancy braking control unit 400 cannot recognize, through the third communication 203, whether the driving mode of the autonomous vehicle is an autonomous driving mode or a driver driving mode. Therefore, based on the information from the sensor unit 500, the breakdown determining unit 410 autonomously determines whether the current driving mode is the autonomous driving mode or the driver driving mode.

Since the redundancy braking control unit 400 is connected to the sensor unit 500 as described above, it is possible to determine through the wheel hydraulic pressure sensor whether the braking is currently performed. With this method, the breakdown determining unit 410 determines whether the main brake control unit 200 has a function failure.

When the breakdown determining unit 410 determines that the main brake control unit 200 has a function failure, the target braking force calculating unit 420 calculates the target braking force for each mode (autonomous driving mode or driver driving mode).

When the autonomous vehicle is currently traveling in the autonomous driving mode, it is necessary to pass a driving control authority to the driver. However, a predetermined amount of time (hereinafter, referred to as a mode switching time) is required to switch from the autonomous driving mode to the driver driving mode. The braking force required for the mode switching time may be a braking force required for the autonomous vehicle to move to a safe area, for example, a shoulder of a road or an emergency stop zone.

The mode switching time is the time from a point in time at which the main brake control unit 200 has a function failure to a point in time (hereinafter, referred to as a point in time of mode switching) at which the mode switching is completed, and the mode switching time may be variously set.

Figure 3:
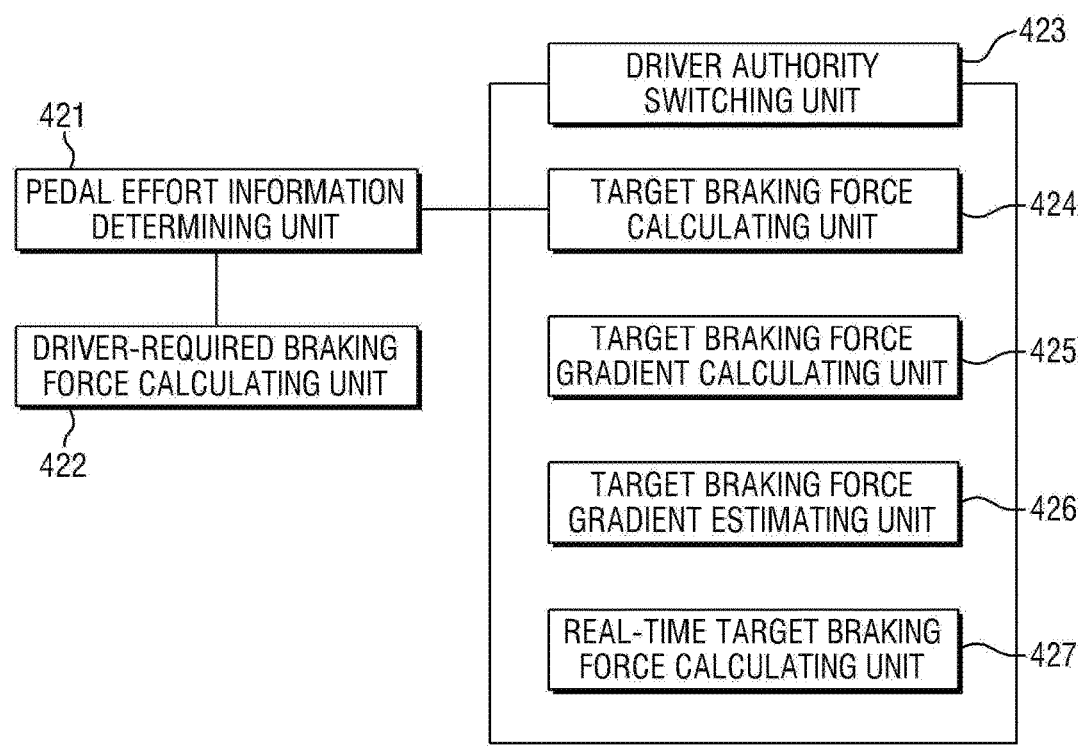
FIG. 3 is a view illustrating a configuration of a target braking force calculating unit illustrated in FIG. 2.

FIG. 3 is a view illustrating a configuration of the target braking force calculating unit illustrated in FIG. 2.

Referring to FIG. 3, in order to obtain a braking force (hereinafter, referred to as a target braking force) required for the mode switching time, the target braking force calculating unit 420 includes a pedal effort information determining unit 421, a driver-required braking force calculating unit 422, and a driver authority switching unit 423.

The pedal effort information determining unit 421 receives information about the pedal effort applied to the brake pedal by the driver for the mode switching time and compares the pedal effort information with a critical value. Here, the pedal effort information includes an operating force applied to the brake pedal, an operating time, and the like. The pedal effort information determining unit 421 compares the inputted operating force and the inputted operating time with critical values (critical operating force and critical operating time).

The brake pedal may be operated by the driver's mistake after the point in time of the function failure of the main brake control unit 200. In this case, a dangerous situation may be caused because the braking force generated by the driver's mistake is added to the target braking force calculated by the driver authority switching unit 423 to be described below.

Therefore, in order to inhibit such a problem, when the operating force and the operating time, which is information about the pedal effort applied to the brake pedal, are lower and shorter than the critical operating force and the critical operating time based on the vehicle interior information, the pedal effort information determining unit 421 ignores the braking force generated by the driver and transmits a control signal so that the driver authority switching unit 423 obtains the target braking force.

Here, the critical operating force is a value of a target braking force calculated by a target braking force calculating unit 424 to be described below, and the critical operating time is a predetermined value.

Meanwhile, in order for the driver authority switching unit 423 to calculate the target braking force, both of the operating force applied to the brake pedal and the operating time need to be smaller than the critical values. If only one of the operating force and the operating time is greater than the critical value, it may be determined that the braking is performed as the driver accidentally steps on the brake pedal without paying attention to the driving. The case in which the pedal effort information is smaller than the critical value includes a case in which the brake pedal is not operated.

On the contrary, when the pedal effort information is greater than the critical value, the pedal effort information determining unit 421 determines that the mode is changed to the driver driving mode in accordance with the driver's intention, and the pedal effort information determining unit 421 transmits a control signal so that the driver-required braking force calculating unit 422 obtains the target braking force.

When the sensor unit 500 measures a pedal operating pedal effort generated when the driver manipulates the brake pedal and a pedal simulator measures a pedal operating hydraulic pressure, the driver-required braking force calculating unit 422 obtains the target braking force by calculating the measured values.

The driver authority switching unit 423 is configured to obtain the target braking force for the mode switching time regardless of the driver's intention and includes a target braking force calculating unit 424, a target braking force gradient calculating unit 425, a target braking force gradient estimating unit 426, and a real-time target braking force calculating unit 427.

Based on the information stored in the memory unit 600, the target braking force calculating unit 424 calculates an overall magnitude of the target braking force required for the main brake for the mode switching time. For example, if there is no obstacle on the driving road on which the autonomous vehicle travels and thus there is no possibility of collision based on the vehicle exterior information, the target braking force calculating unit 424 decreases the magnitude of the target braking force. If there is an obstacle on the driving road on which the autonomous vehicle travels and thus there is a possibility of collision, the target braking force calculating unit 424 increases the magnitude of the target braking force.

Meanwhile, the target braking force gradient calculating unit 425 and the target braking force gradient estimating unit 426 are operated based on whether the redundancy braking control unit 400 receives the third control signal generated from the main brake control unit 200 before the point in time of the function failure of the main brake control unit 200.

Specifically, if there is no third control signal from the main brake control unit 200 before the point in time of the function failure of the main brake control unit 200, the target braking force gradient calculating unit 425 is operated. Based on the information stored in the memory unit 600, the target braking force gradient calculating unit 425 calculates a gradient (hereinafter, referred to as a target braking force gradient) between a braking force at the point in time of the function failure of the main brake control unit 200 and a braking force at the point in time of the mode switching. Here, the braking force at the point in time of the function failure of the main brake control unit 200 means the current braking force, and the braking force at the point in time of mode switching means a magnitude of the target braking force calculated by the target braking force calculating unit 424. In this case, the current braking force is 0 because there is no control signal from the main brake control unit 200.

Figure 4:
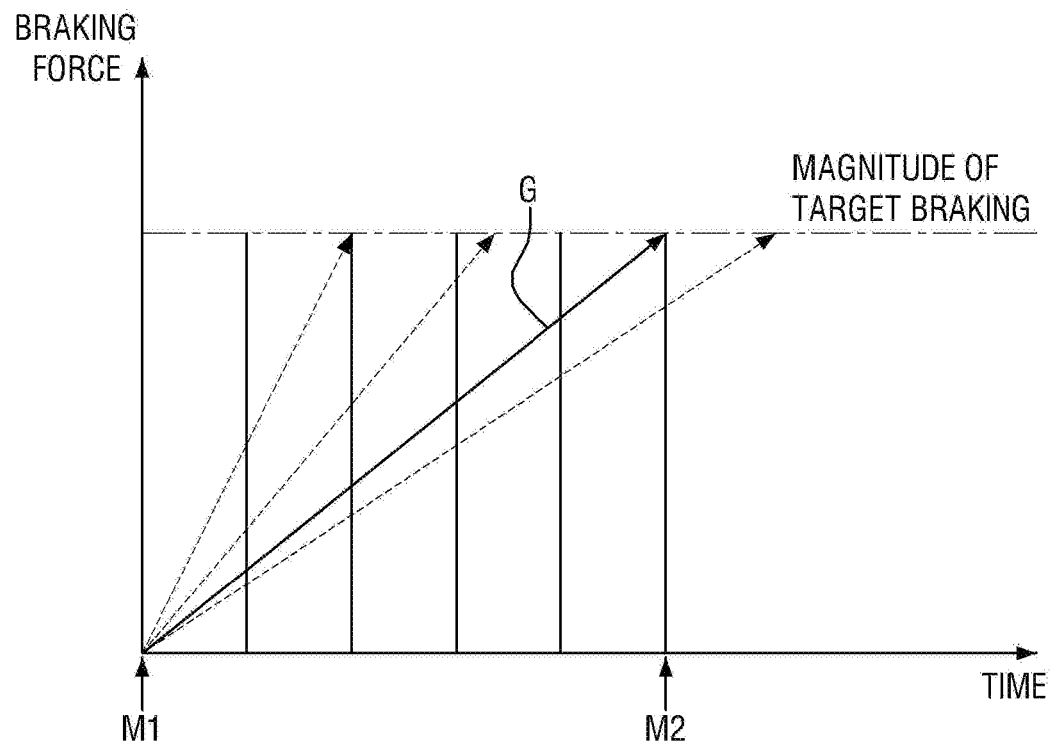
FIG. 4 is a view illustrating magnitudes of braking forces matched with a gradient of target braking force at predetermined time intervals.

FIG. 4 is a view illustrating magnitudes of braking forces matched with a gradient of a target braking force at predetermined time intervals.

Referring to FIG. 4, when the point in time (M1 point) of the function failure of the main brake control unit 200 and the point in time (M2 point) of mode switching are determined, a gradient is formed between a magnitude of the braking force at the M1 point and a magnitude of the braking force at the M2 point. FIG. 4 illustrates a target braking force gradient having various sizes, which means that the gradient of the target braking force may vary depending on the vehicle interior information or the vehicle exterior information. For example, based on the vehicle exterior information, the gradient of the target braking force is decreased if there is no obstacle on the driving road on which the autonomous vehicle travels and thus there is no possibility of collision, and the gradient of the target braking force is increased if there is an obstacle on the driving road on which the autonomous vehicle travels and thus there is a possibility of collision.

The target braking force gradient estimating unit 426 is operated when there is the third control signal from the main brake control unit 200 before the point in time of the function failure of the main brake control unit 200. When there is previous braking force gradient information stored in advance in the memory unit 600 before the point in time of the function failure of the main brake control unit 200, the target braking force gradient estimating unit 426 estimates the target braking force gradient.

When the overall magnitude of the target braking force calculated by the target braking force calculating unit 424 is equal to the magnitude of the braking force before the point in time of the function failure of the main brake control unit 200, the target braking force gradient estimating unit 426 maintains the braking force before the point in time of the function failure. Therefore, the braking force gradient is 0.

As described above, the target braking force gradient estimating unit 426 estimates the target braking force gradient based on the previous braking force gradient stored in the memory unit 600. However, if there is an obstacle on the driving road on which the autonomous vehicle travels and thus there is a possibility of collision, there is a risk that the autonomous vehicle collides with the obstacle because the magnitude of the braking force calculated based on the previous braking force gradient is insufficient. Therefore, the target braking force gradient estimating unit 426 increases the gradient of the target braking force when there is an obstacle on the driving road on which the autonomous vehicle travels and there is a possibility of collision.

The real-time target braking force calculating unit 427 calculates, in real time, the magnitude of the braking force capable of being controlled at predetermined time intervals by using the gradients of the target braking force and the target braking force which are calculated by the target braking force calculating unit 424, the target braking force gradient calculating unit 425, and the target braking force gradient estimating unit 426.

Specifically, referring to FIG. 4, when the gradient of the target braking force is set to G, the magnitude of the braking force, which is matched with the gradient of the target braking force, is calculated for each point in time divided into multiple sections for a switching time (time between the M1 point and the M2 point). FIG. 4 illustrates that the mode switching time is divided into five points in time, but the number of times (time intervals) the mode switching time is divided may be variously set.

The target braking force calculating unit 420 performs control such that the driver authority switching unit 423 calculates the target braking force in the autonomous driving mode, and the driver-required braking force calculating unit 422 calculates the target braking force in the driver driving mode.

The ESC braking force operating unit 430 performs control such that the hydraulic pressure is simultaneously applied to the front wheel and the rear wheel based on the target braking force calculated by the target braking force calculating unit 420.

The rear-wheel EPB braking force operating unit 440 performs control such that the hydraulic pressure is applied to the rear wheel based on the target braking force at the same time as an operation of a rear-wheel ESC braking force. The target braking force is applied to the rear wheel by operating the ESC first that performs a reaction fast, but because a performance of the ESC actuator is reduced when the ESC is operated over a long period of time, the rear-wheel ESC braking force is replaced with the rear-wheel EPB braking force.

The rear-wheel ESC braking force releasing unit 450 controls and releases the rear-wheel ESC braking force when a rear-wheel EPB braking force satisfies the target braking force. When the rear-wheel ESC braking force is released, the hydraulic pressure generated by the rear-wheel ESC is dropped to the atmospheric pressure.

The rear-wheel EPB braking force adding/increasing unit 460 determines in advance whether to additionally increase the rear-wheel EPB braking force. Here, the increase in rear-wheel EPB braking force is possible until no wheel slip occurs in the rear wheel.

When the rear-wheel EPB braking force adding/increasing unit 460 adds the rear-wheel EPB braking force, the front-wheel ESC braking force reducing unit 470 controls and decreases the front-wheel ESC braking force within a range in which the target braking force is satisfied. The reason why the front-wheel ESC braking force is decreased as described above is to consider the decrease in performance of the ESC actuator.

Figure 5A:
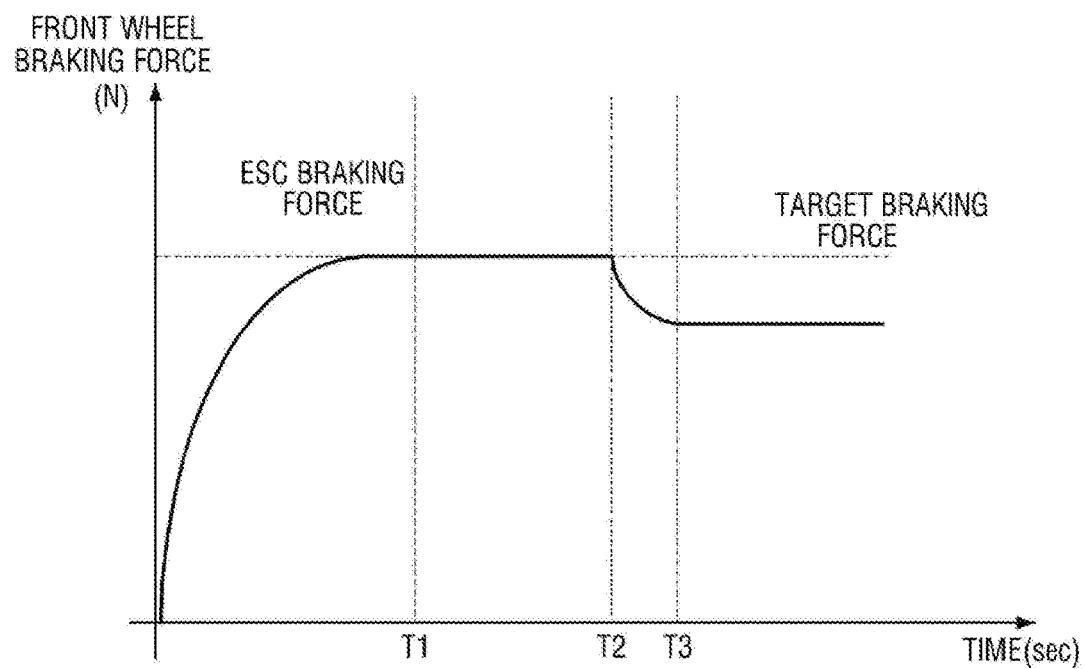
FIGS. 5A and 5B are braking force diagrams in a state in which a control method of the redundancy braking control unit according to the exemplary form of the present disclosure is applied to a front wheel and a rear wheel.
Figure 5B:
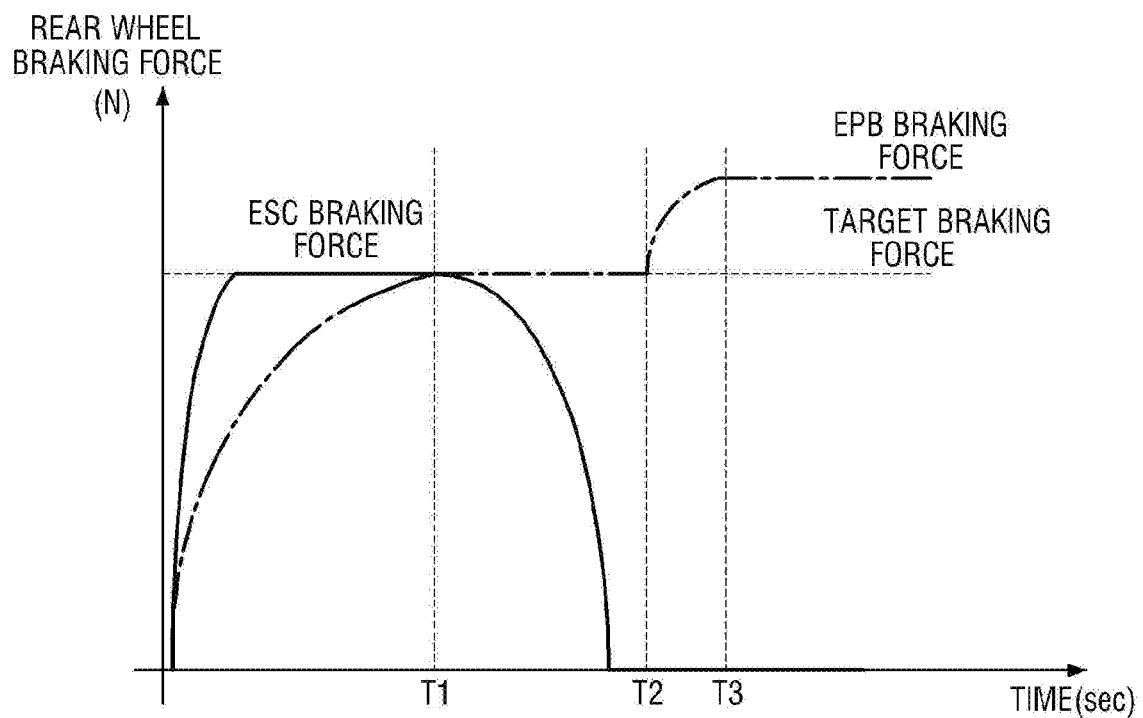

FIGS. 5A and 5B are braking force diagrams in a state in which a control method of the redundancy braking control unit according to the exemplary form of the present disclosure is applied to the front wheel and the rear wheel. The times T1 to T3 illustrated in FIGS. 5A and 5B mean the same point in time in the respective drawings.

Referring to FIGS. 5A and 5B, the ESC braking forces for the front wheel and the rear wheel are increased until the target braking force is satisfied by the ESC braking force operating unit 430. The rear-wheel ESC braking force begins to be released at a point in time T1 at which the rear-wheel EPB braking force reaches the target braking force. Thereafter, the front-wheel ESC braking force begins to be decreased at a point in time T2 at which the rear-wheel EPB braking force is additionally increased, and finally, the decreased front-wheel ESC braking force and the increased rear-wheel EPB braking force are maintained at a point in time T3.

Figure 6:
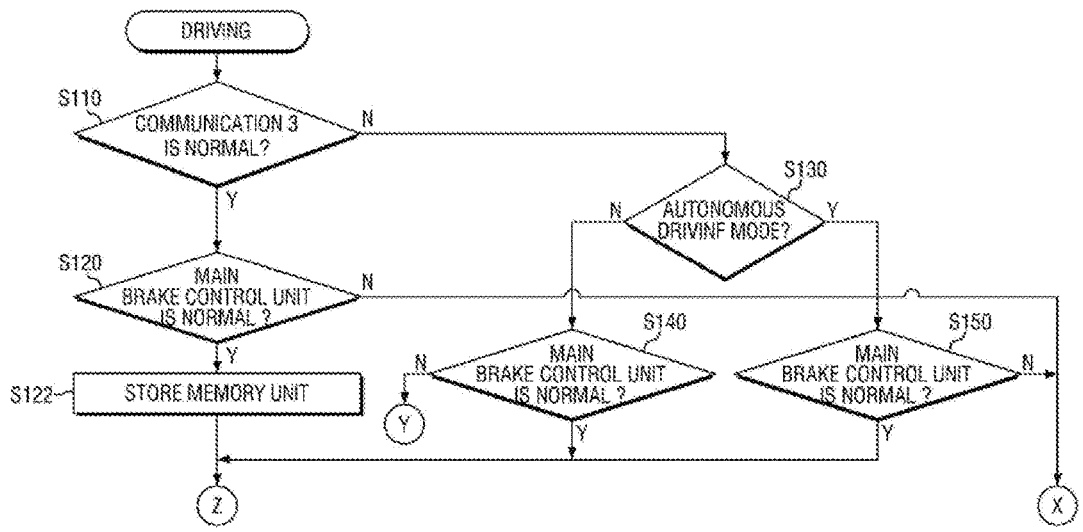
FIG. 6 is a flowchart illustrating a method of determining whether a main brake control unit is broken down based on whether the redundancy braking control unit according to the exemplary form of the present disclosure communicates with the main brake control unit.
Figure 7:
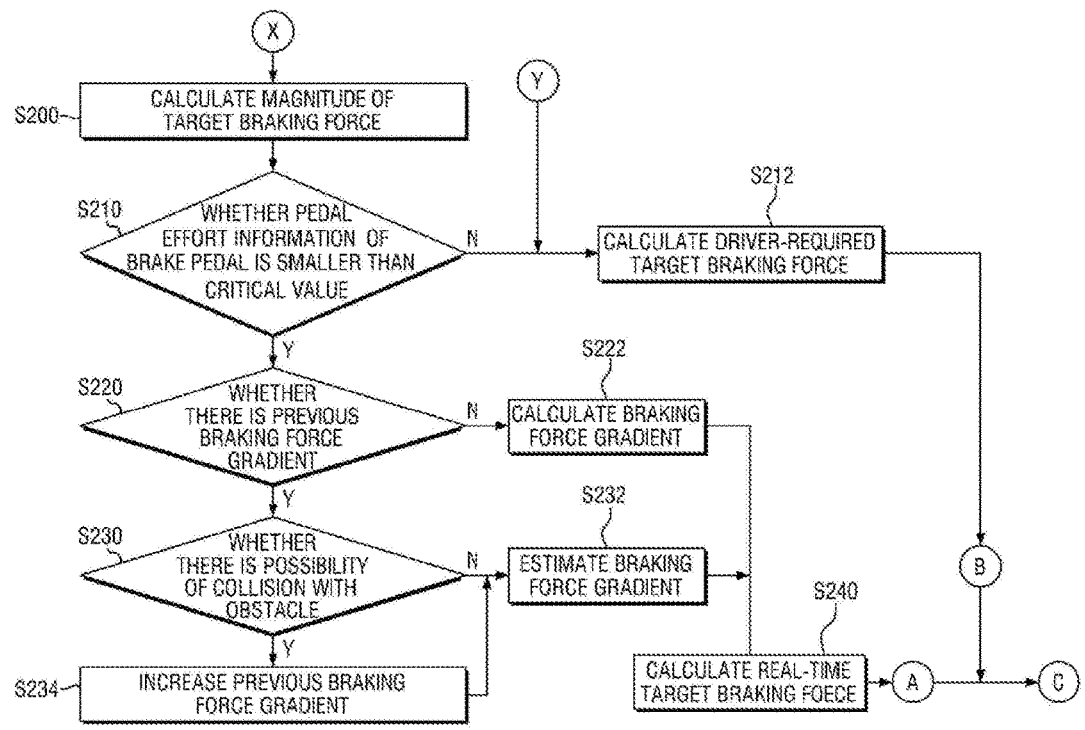
FIG. 7 is a flowchart illustrating a method of obtaining the target braking force by the redundancy braking control unit according to the exemplary form of the present disclosure.
Figure 8:
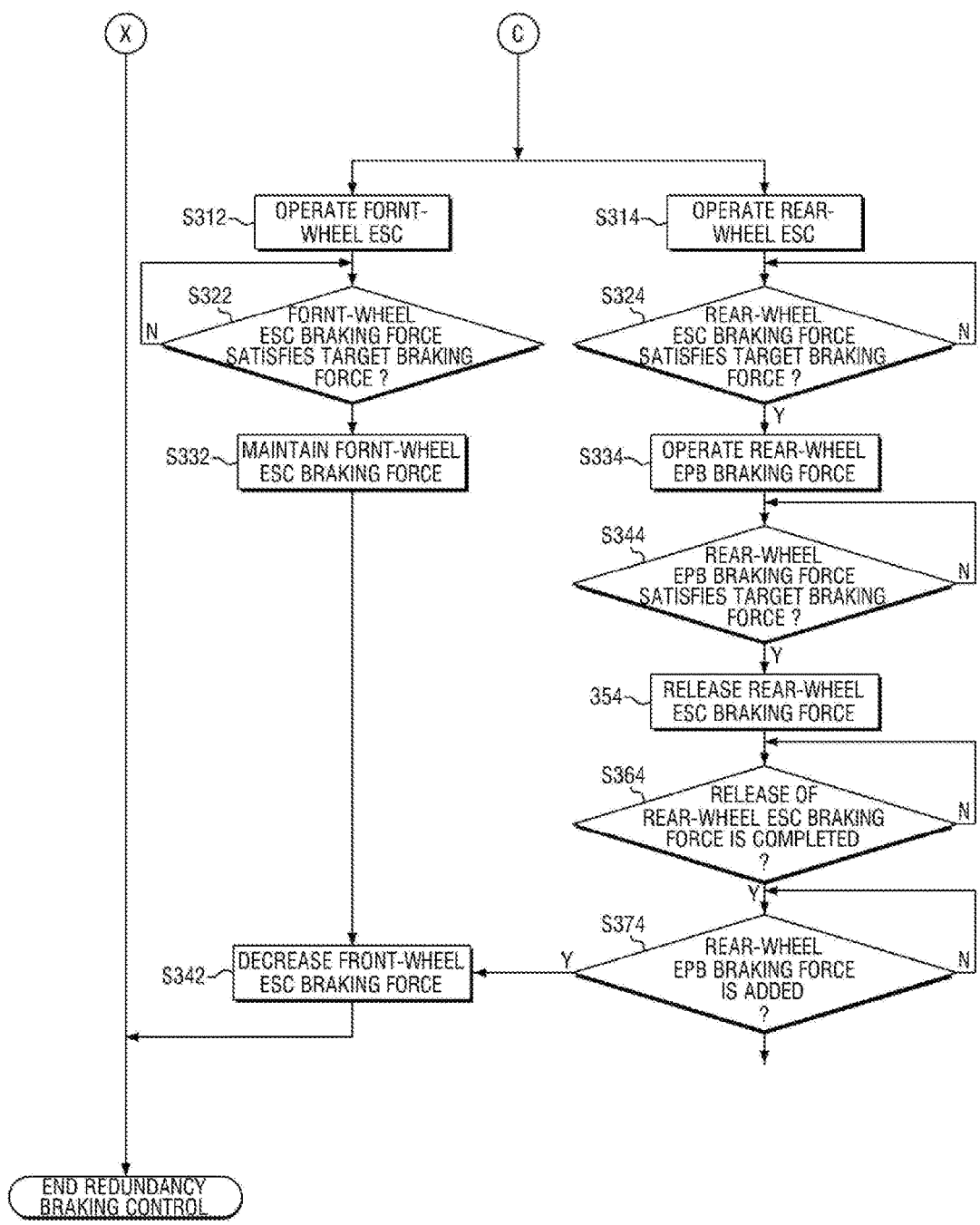
FIG. 8 is a flowchart illustrating a cooperative control method between ESC and EPB of the redundancy braking control unit according to the exemplary form of the present disclosure.

FIG. 6 is a flowchart illustrating a method of determining whether the main brake control unit is broken down based on whether the redundancy braking control unit according to the exemplary form of the present disclosure communicates with the main brake control unit, FIG. 7 is a flowchart illustrating a method of obtaining the target braking force by the redundancy braking control unit according to the exemplary form of the present disclosure, and FIG. 8 is a flowchart illustrating a cooperative control method between ESC and EPB of the redundancy braking control unit according to the exemplary form of the present disclosure.

Hereinafter, an operating process of the redundancy braking control unit will be described with reference to FIGS. 6 to 8.

Referring to FIG. 6, the redundancy braking control unit 400 determines whether the third communication 203 is normal (S110). When the third communication 203 is normal, the redundancy braking control unit 400 determines whether the main brake control unit 200 is normal (S120). The redundancy braking control unit 400 stores information generated by the main brake control unit 200 in the memory unit 600 (S122) when the main brake control unit 200 is normal, and the redundancy braking control unit 400 obtains the target braking force (X) when the main brake control unit 200 is not normal. On the contrary, whether the currently driving autonomous vehicle is in the autonomous driving mode or the driver driving mode is determined (S130) when the third communication 203 is not normal. Here, whether the main brake control unit 200 is normal in each mode is determined (S140 and S150), but different methods X and Y of obtaining the target braking force are applied when the main brake control unit 200 is not normal. In contrast, the main brake control unit 200 is operated when the main brake control unit 200 is normal in each mode.

Hereinafter, a method of obtaining the target braking force by the redundancy braking control unit 400 in case of a breakdown of the main brake control unit 200 will be described.

Referring to FIG. 7, in the method (X) of obtaining the target braking force in the autonomous driving mode, the target braking force calculating unit 424 calculates the magnitude of the target braking force for the mode switching time (S200) when the main brake control unit 200 has a function failure. The calculated magnitude of the target braking force is used as the critical operating force.

Next, whether the pedal effort information applied to the brake pedal is smaller than the critical value is determined (S210). When the pedal effort information is greater than the critical value, the driver-required braking force calculating unit 422 obtains the target braking force based on the pedal effort information (S212). On the contrary, when the pedal effort information is smaller than the critical value, the driver authority switching unit 423 is operated to obtain the target braking force.

Meanwhile, the method Y of obtaining the target braking force in the driver driving mode is identical to the method of obtaining the target braking force by the driver-required braking force calculating unit 422. The target braking force calculated by the driver-required braking force calculating unit 422 is B.

The memory unit 600 may include braking force information set before the main brake control unit 200 has a function failure. Therefore, the memory unit 600 determines whether the previous braking force gradient information is stored (S220). The gradient of the target braking force is calculated (S222) when there is no previous braking force gradient information in the memory unit 600.

Whether there is a possibility of collision with an obstacle is determined (S230) when there is previous braking force gradient information in the memory unit 600. The gradient of the target braking force is estimated based on the previous braking force gradient (S232) when there is no possibility of collision with an obstacle, and the gradient of the target braking force is estimated by increasing the previous braking force gradient (S234) when there is a possibility of collision with an obstacle.

The magnitude of the braking force, which needs to be controlled at predetermined time intervals, is calculated in real time (S240) by using the magnitude of the target braking force calculated through the above-mentioned process and by using the gradient of the target braking force calculated or estimated through the above-mentioned process. The magnitude of the target braking force calculated in this manner is A.

The target braking force A or B calculated through the above-mentioned process is used as C which is the target braking force of the ESC and EPB cooperative control.

Hereinafter, a method of performing the ESC and EPB cooperative control by the redundancy braking control unit 400 to satisfy the calculated target braking force will be described.

Referring to FIG. 8, the redundancy braking control unit 400 performs controls such that the ESC braking forces for the front wheel and the rear wheel are generated simultaneously based on the calculated target braking force (S312 and S314). In this case, the redundancy braking control unit 400 according to the exemplary form of the present disclosure performs control such that the rear-wheel EPB braking force is generated after the rear-wheel ESC braking force satisfies the target braking force (S324 and S334). However, according to another exemplary form of the present disclosure, the redundancy braking control unit 400 may perform control such that the rear-wheel EPB braking force is generated at the same time as the front-wheel ESC braking force is generated, or the rear-wheel EPB braking force is generated with the time interval from the point in time at which the rear-wheel ESC braking force is generated.

When the front-wheel ESC braking force and the rear-wheel ESC braking force satisfy the target braking force, the redundancy braking control unit 400 maintains the front-wheel ESC braking force (S332) and determines whether the rear-wheel EPB braking force satisfies the target braking force (S344). When the rear-wheel EPB braking force satisfies the target braking force, the redundancy braking control unit 400 controls and releases the rear-wheel ESC braking force (S354).

Thereafter, when the release of the rear-wheel ESC braking force is completed (S364), the redundancy braking control unit 400 determines whether to add the rear-wheel EPB braking force (S374). If the rear-wheel EPB braking force is added, the front-wheel ESC braking force is decreased (S342).

In the exemplary form of the present disclosure, the redundancy braking control unit 400 is still operated so that the target braking force is satisfied in a case (first case) in which the ESC braking forces for the front wheel and the rear wheel and the EPB braking force for the rear wheel do not satisfy the target braking force, or the redundancy braking control unit 400 is still operated so that the release of the rear-wheel ESC braking force and the addition of the rear-wheel EPB braking force are completed in a case (second case) in which the release of the rear-wheel ESC braking force is not completed and in a case (third case) in which the addition of the rear-wheel EPB braking force is not completed. However, in another exemplary form of the present disclosure, the operating process illustrated in FIG. 7 may be determined for every cycle. In this case, the control is ended in the first to third cases, the process is started again from the initial process illustrated in FIG. 8, such that the first to third cases may be satisfied or completed.

Meanwhile, when the function of the main brake control unit 200 is normal, the process ends without performing the redundancy braking (Z).

Meanwhile, examples of a communication network between the first to third communication 201 to 301, the respective control unit, the sensor unit 500, and the memory unit 600 includes a controller area network (CAN), a local interconnect network (LIN), FlexRay, media oriented system transport (MOST), and the like.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. A system for operating redundancy braking in case of a breakdown of a main brake for an autonomous vehicle, the system comprising:
    a main brake control unit configured to output a control signal so that a frictional braking force is generated to the main brake of the autonomous vehicle by hydraulic pressure;
    a redundancy braking control unit configured to perform communication with the main brake control unit and perform cooperative control between electronic stability control (ESC) and an electronic parking brake (EPB) so that a calculated target braking force is satisfied when it is determined that the main brake control unit has a function failure; and
    a sensor unit configured to receive vehicle interior information and vehicle exterior information of the autonomous vehicle and transmit the vehicle interior information and the vehicle exterior information to the redundancy braking control unit,
    wherein the redundancy braking control unit controls and replaces rear-wheel ESC braking force with rear-wheel EPB braking force when the rear-wheel ESC braking force satisfies the target braking force,
    wherein the redundancy braking control unit includes a breakdown determining unit configured to determine whether the main brake control unit is broken down based on an autonomous driving mode or a driver driving mode,
    wherein the redundancy braking control unit is configured to determine whether the main brake control unit is broken down based on wheel hydraulic pressure information received through the sensor unit when the communication between the redundancy braking control unit and the main brake control unit is failed, and
    wherein when it is determined that the main brake control unit is broken down in the autonomous driving mode, the redundancy braking control unit is configured to calculate the target braking force based on information collected by the sensor unit and apply the target braking force until the autonomous driving mode is switched to the driver driving mode.

2. The system of claim 1, wherein when it is determined that the main brake control unit is broken down in the driver driving mode, the redundancy braking control unit calculates the target braking force based on information about a pedal effort applied to a brake pedal.

3. The system of claim 1, wherein the redundancy braking control unit includes a rear-wheel EPB braking force operating unit configured to simultaneously operate the rear-wheel EPB braking force and the rear-wheel ESC braking force.

4. The system of claim 2, wherein the redundancy braking control unit includes a rear-wheel ESC braking force releasing unit configured to release the rear-wheel ESC braking force when the rear-wheel EPB braking force satisfies the target braking force.

5. The system of claim 1, wherein the redundancy braking control unit includes a rear-wheel EPB braking force increasing unit configured to determine whether to add the rear-wheel EPB braking force after the rear-wheel ESC braking force is released, and a front-wheel ESC braking force decreasing unit configured to decrease front-wheel ESC braking force when the rear-wheel EPB braking force is added.

6. A method of operating redundancy braking in case of a breakdown of a main brake for an autonomous vehicle, the method comprising the steps of:
    determining whether a main brake control unit and a redundancy braking control unit of the autonomous vehicle communicate with each other;
    determining, by the redundancy braking control unit, whether the main brake control unit has a function failure;
    calculating, by the redundancy braking control unit, a target braking force when it is determined that the main brake control unit has a function failure; and
    performing, by the redundancy braking control unit, cooperative control between electronic stability control (ESC) and an electronic parking brake (EPB) so that the calculated target braking force is satisfied, and performing control to replace rear-wheel ESC braking force with rear-wheel EPB braking force when the rear-wheel ESC braking force satisfies the target braking force,
    wherein the step of determining whether the main brake control unit and the redundancy braking control unit communicate with each other includes the step of determining whether the autonomous vehicle is in an autonomous driving mode or a driver driving mode when the main brake control unit and the redundancy braking control unit do not communicate with each other, and
    wherein the step of calculating the target braking force when the function failure of the main brake control unit is determined includes the step of calculating the target braking force based on information collected by a sensor unit for a period time for which the autonomous driving mode is switched to the driver driving mode when the autonomous vehicle is in the autonomous driving mode and the main brake control unit is broken down.

7. The method of claim 6, wherein the step of calculating the target braking force when the function failure of the main brake control unit is determined includes the step of calculating the target braking force based on information about a pedal effort applied to a brake pedal when the autonomous vehicle is in the driver driving mode and the main brake control unit is broken down.

8. The method of claim 6, wherein the steps of performing cooperative control between the ESC and the EPB, and performing control to replace the real-wheel ESC braking force with the rear-wheel EPB braking force include the step of controlling and simultaneously operating, by the redundancy braking control unit, the rear-wheel EPB braking force and the rear-wheel ESC braking force.

9. The method of claim 6, wherein the steps of performing cooperative control between the ESC and the EPB, and performing control to replace the real-wheel ESC braking force with the rear-wheel EPB braking force include step of controlling and releasing, by the redundancy braking control unit, the rear-wheel ESC braking force when the rear-wheel EPB braking force satisfies the target braking force.

10. The method of claim 9, wherein the steps of performing cooperative control between the ESC and the EPB, and performing control to replace the real-wheel ESC braking force with the rear-wheel EPB braking force include steps of determining, by the redundancy braking control unit, whether to add the rear-wheel EPB braking force after the rear-wheel ESC braking force is released, and decreasing, by the redundancy braking control unit, front-wheel ESC braking force when the rear-wheel EPB braking force is added.

\* \* \* \* \*